United States Patent [19]

Horak

[11] Patent Number: 4,547,858
[45] Date of Patent: Oct. 15, 1985

[54] DYNAMIC CONTROL FOR MANIPULATOR
[75] Inventor: Dan Horak, Columbia, Md.
[73] Assignee: Allied Corporation, Morris Township, Morris County, N.J.
[21] Appl. No.: 503,921
[22] Filed: Jun. 13, 1983
[51] Int. Cl.[4] .................. G06F 15/46; G05B 19/42
[52] U.S. Cl. .................. 364/513; 318/568; 364/193; 901/9; 901/15
[58] Field of Search .......... 364/513, 191–193; 318/568; 414/730, 744; 901/2-5, 9, 14, 15

[56] References Cited
U.S. PATENT DOCUMENTS

| | | | |
|---|---|---|---|
| 3,845,284 | 10/1974 | Taguchi et al. | 235/150.1 |
| 3,909,600 | 9/1975 | Hohn | 235/151.11 |
| 4,011,437 | 3/1977 | Hohn | 235/151.11 |
| 4,021,651 | 5/1977 | Mitsuhashi et al. | 235/151.11 |
| 4,068,156 | 1/1978 | Johnson et al. | 318/515 |
| 4,218,172 | 8/1980 | Freund | 414/730 |
| 4,243,923 | 1/1981 | Whitney et al. | 318/561 |
| 4,283,764 | 8/1981 | Crum et al. | 364/513 |
| 4,308,584 | 12/1981 | Arai | 364/513 |
| 4,338,672 | 7/1982 | Perzley et al. | 364/193 X |

OTHER PUBLICATIONS

Luh, J. Y. S. et al., "On-Line Computational Scheme for Mechanical Manipulators" *Journal of Dynamic Systems Measurement and Control*, vol. 102, Jun. 1980.
Uicker Jr., "Dynamic Force Analysis of Spatial Linkages" *Transactions of the ASME, Journal of Applied Mechanics*, Jun. 1967.
Kahn et al., "The Near-Minimum-Time Control of Open Loop Articulated Chains" *Transactions of the ASME, Journal of Dynamic Systems, Measurement and Control*, Sep. 1971.
Hollerbach, J. M. "A. Recursive Lagrangian Formulation of Manipulator Dynamics and a Comparative Study of Dynamics Formulation Complexity" *IEEE Transactions on Systems, Man and Cybernetics*, vol. SMC 10, No. 11, Nov. 1980.

Primary Examiner—Joseph Ruggiero
Attorney, Agent, or Firm—James R. Ignatowski; Russel C. Wells

[57] ABSTRACT

A dynamic control for a multi-link manipulator having a central processing unit, a linear dynamics control loop and a fast nonlinear dynamics control loop. The linear dynamics control loop has servo amplifiers and associated power amplifiers for actuating the links in response to the signals generated by the central processing unit and sensors generating the requisite feedback signals. The nonlinear dynamics control loop comprises a nonlinear dynamics control computer generating correction signals corresponding to the nonlinear dynamics of the manipulator links in response to the signals generated by the central processing unit and feedback signal and means for summing the correction signals with the signals generated by the servo amplifiers. The nonlinear dynamics control computer generates the correction signals for the first 3 links of the manipulator using Lagrangian dynamics and generates the correction signals for the remaining links using recursive Newton-Euler dynamics.

20 Claims, 8 Drawing Figures

DYNAMIC CONTROL FOR MANIPULATOR

FIELD OF THE INVENTION

The invention is related to programmed manipulators or in a more limited embodiment referred to as industrial "robots"; and more specifically to dynamic controls for manipulators having a fast nonlinear dynamics control loop.

BACKGROUND OF THE INVENTION

The development of programmed manipulators or robots is progressing at a rapidly increasing pace in the United States as elsewhere in the world. Currently, the industrial robots, such as taught by Hohn in U.S. Pat. No. 3,909,600, employ dynamic control laws which ignore the complex nonlinear dynamics of the various moving elements which result in less than optimal response. The computational bottleneck of many advanced dynamic control schemes is an algorithm for computation of the actuator torques and/or forces required to produce the desired joint accelerations, for a given set of joint velocities and angles.

The dynamics of an "n" link manipulator can be described by the following set of n nonlinear differential equations.

$$T = J(q)\ddot{q} + f(q,\dot{q}) + g(q) \quad (1)$$

where

| |
|---|
| q = n × 1 vector of joint angles (displacements) |
| J(q) = n × n inertia matrix |
| f(q,q̇) = n × 1 vector of centripetal and Coriolis torques (forces) |
| g(q) = n × 1 vector of gravity torques (forces) |
| T = n × 1 vector of actuator torques (forces) |

For a typical 6 link manipulator, the functions J, f and g in Equation 1 are very complex, nonlinear expressions. Because of this complexity, most proposed control schemes are based on breaking down or decoupling Equation 1 into n linear differential equations. The decoupling feedback is given by:

$$T = J(q)u + f(q,\dot{q}) + g(q) \quad (2)$$

where $u = n \times 1$ vector of desired joint accelerations

Equation 2 transforms the original system given by equation 1 into the following linear, decoupled system.

$$\begin{bmatrix} \dot{q} \\ \ddot{q} \end{bmatrix} = \begin{bmatrix} 0 & I \\ 0 & 0 \end{bmatrix} \begin{bmatrix} q \\ \dot{q} \end{bmatrix} + \begin{bmatrix} 0 \\ I \end{bmatrix} u \quad (3)$$

The system described by Equation 3 is easily controlled by any standard control technique.

Equation 2 constantly changes when the manipulator moves, because J, f and g are dependent on the joint angles. Thus to achieve decoupling at all times, the decoupling torques T must be continuously recomputed in real time. In order to avoid introduction of undesirable dynamic effects the required frequency of computation is about 100 times per second. This is the bottleneck in any control scheme, because it involves an excessive number of floating point additions and multiplications.

Numerous schemes for computation of Equation 2 have been proposed during the last fifteen years. A comprehensive comparison of these techniques is presented by J. M. Hollerbach in his article "A Recursive Lagangian Formulation of Manipulator Dynamics and a Comparative Study of Dynamics Formulation Complexity" *IEEE Transactions on Systems, Man and Cybernetics*, Vol. 10, No. 11, November 1980, pp 730-736. The most elegant formulation of the problem, based on Lagrange's equation, is due to J. J. Uicker "On the Dynamic Analysis of Spatial Linkages Using 4×4 Matrices" *Ph. D. Dissertation, Northwestern University*, August 1965, and M. E. Kahn "The Near-Minimum-Time Control of Open Loop Articulated Kinematic Chains", *Stanford University* A. I. Memo 177 September 1969. Unfortunately, the (Uicker/Kahn) formulation is unsuitable for real-time computation, because for a typical six link manipulator it involves about 118,000 additions and multiplications per trajectory point. J. Y. S. Luh, M. M. Walker and R. P. C. Paul, in their article "On Line Computational Scheme for Mechanical Manipulators" *ASME Journal of Dynamic Systems, Measurement and Control*, Vol. 102, No. 2, June 1980, pp 69-76 disclosed that the execution time of Equation 2 for a six link manipulator using Lagrange's equation is 7.9 seconds. This is approximately 790 times longer than the 0.01 second goal for current systems. The fastest exact computational scheme known today is the recursive Newton-Euler technique disclosed by Luh et al in the above article. This scheme first computes the velocities and the accelerations of the manipulator links, going from the manipulator base to the last link. It then computes the torques and forces acting on the links, going from the last link back to the base. All the computations are performed in link coordinates, which significantly reduces the number of coordinate transformations required and reduces the number of arithmetic operations to 1590 for a six link manipulator. This techniques requires 0.0335 seconds to perform the necessary arithmetic operations. Hollerbach concluded that only very minor improvements can be made to the recursive Newton-Euler formulation disclosed by Luh et al. However, Hollerbach's conclusion only applies to formulations which are very general and can handle manipulators with any number of links and any configuration.

The dynamic manipulator control described herein is based on the fact that most industrial manipulators are relatively simple geometrically and have from 4 to 7 links. Its computational time, in high level languages, is about five or ten times less than that using the technique taught by Luh et al depending on the implementation. The proposed control divides the manipulator into two parts. The first three links (counting from the base) are modeled using classical (non-matrix) Lagrange's equations, with velocities computed in link coordinates. The remaining links (i.e., the wrist) are modeled using recursive Newton-Euler equations.

SUMMARY OF THE INVENTION

The invention is a control system for a multiple link mechanical manipulator or robot having a nonlinear dynamic control loop computing correction factors added to signals generated by the primary linear dynamic control loop correcting the actuator signals for the non-linear dynamics of the manipulator. The primary control comprises a central processing unit having adequate storage and computation capabilities for generating signals indicative of the desired motion of the individual links, a linear dynamic control loop for generating actuator signals controlling the actuators moving the individual manipulator links, and sensors responsive to the position and motion of the individual manipulator links for generating feedback signals to the central processing unit and the linear dynamic control loop. The improvement comprising a nonlinear dynamic control loop for correcting the linear control signals for the nonlinear dynamics of the manipulators, said nonlinear dynamics control loop characterized by a nonlinear dynamics control computer for generating correction factors for each of the actuators moving the manipulator links in response to the motion signals generated by the central processing unit and the feedback signals using Lagrangian dynamics for the first three links and recursive Newton-Euler dynamics for the remaining links, and means for summing the correction factors with the associated actuators signals to correct the actuator signals for the nonlinear dynamics of the manipulator.

The advantages of the manipulator control system are that it is more effective and efficient than the linear control systems of the prior art and the computations for the nonlinear dynamics are capable of being performed at a rate from 5 to 10 times faster than prior art nonlinear control schemes.

These and other factors will become more apparent from a reading of the detailed description of the invention in conjunction with the appended figures.

DETAILED DESCRIPTION OF THE INVENTION

Figure 1:
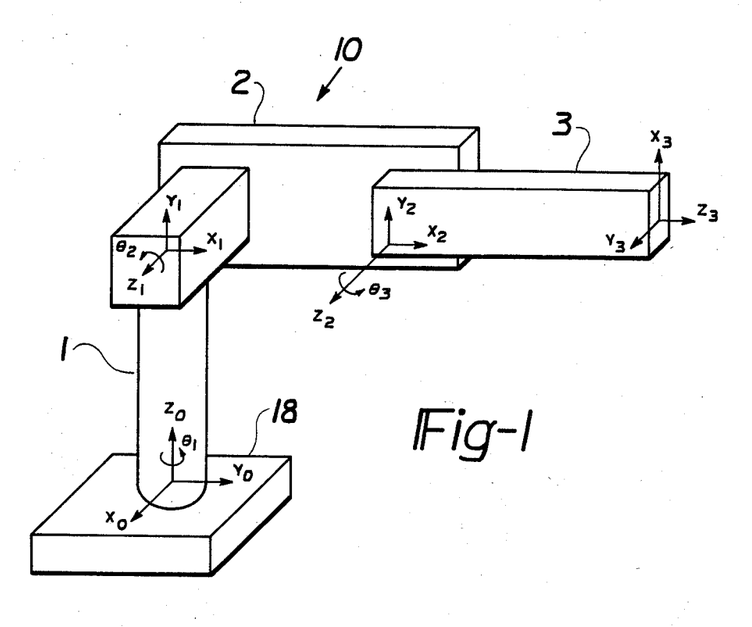
FIG. 1 is a schematic presentation of the first three links of a typical manipulator.
Figure 2:
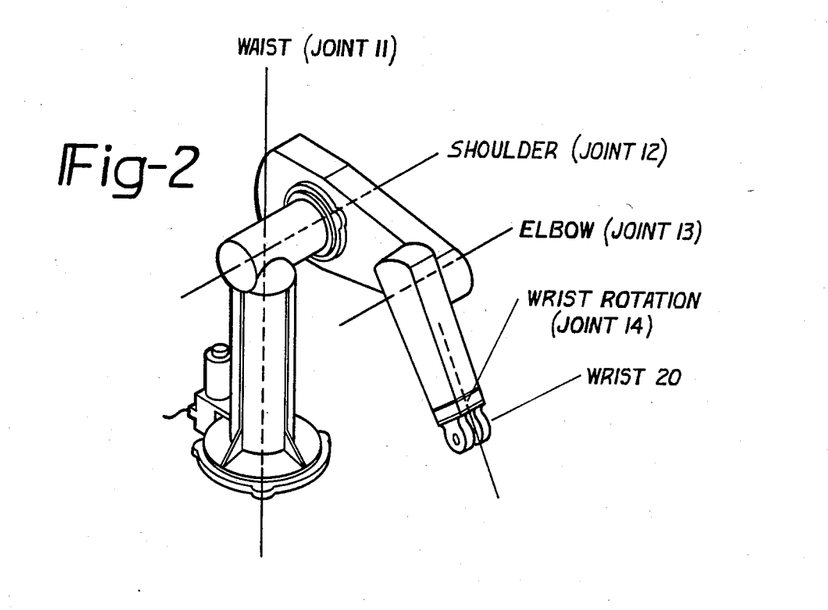
FIG. 2 is a perspective of the first three links of a manipulator identifying the respective joints.

The dynamic manipulator control is based on division of the manipulator into two parts. The first part consists of the first three links (counting from the base), and the second part consists of all the remaining links. Referring to FIG. 1 there is shown schematically the first three links of a typical robot arm 10 comparable to the robot arm disclosed by Hohn in U.S. Pat. No. 3,909,600. The coordinate systems of the links are assigned using the standard convention as taught by Hollerbach cited above, except for link 3, which always has the origin of its coordinates at its end and the (z) axis along its longitudinal axis. In particular, the first three links, Links 1, 2 and 3 are supported from a base 18 as shown. The first link, Link 1 is mounted for rotation from the Base 18 about a vertical axis ($z_0$), the second link, Link 2, is mounted at the end of Link 1 and is rotatable about a first horizontal axis ($z_1$) and the third link, Link 3 is mounted at the end of Link 2 and is rotatable about a second horizontal axis ($z_2$). The z axis ($z_3$) of Link 3 is along its longitudinal axis as shown. The x and y axes complete the right hand system, with x in the vertical plane. This proposed model provides a standard interface between the two parts of robots' arm 10, by means of the forces and moments acting on the end of Link 3 to which the wrist is attached. Thus, any first-three-link arm and any type of wrist will always match. The standard convention previously described does not allow such modularity, because coordinates of Link 3 are determined by the type and orientation of the joint at the end of Link 3. For convenience the joints between the links are identified on FIG. 2. Conventionally there is the Waist Joint 11, the Shoulder Joint 12, the Elbow Joint 13, the Wrist Joint 14 etc.

Figure 3:
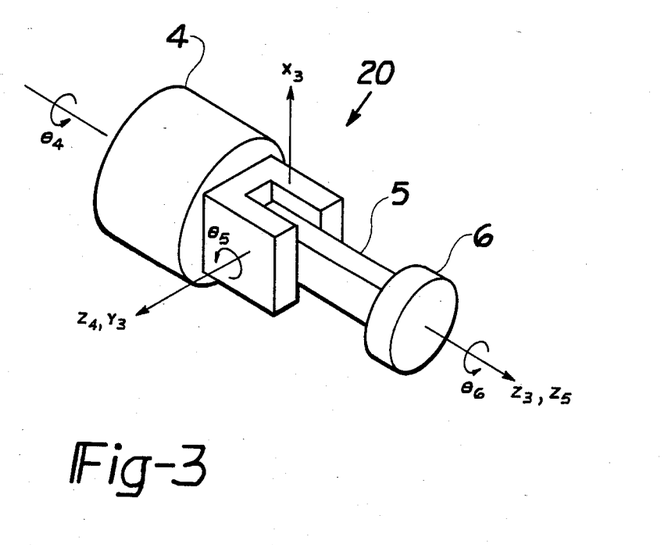
FIG. 3 is a schematic presentation of a typical manipulator wrist.

A typical three degree of freedom Wrist 20 is shown in FIG. 3. Its reference frame is the system of coordinates of Link 3. As shown, Wrist 20 has a fourth link, Link 4 mounted to the end of Link 3 and is rotatable about the axis ($z_3$) of the Link 3, a fifth link, Link 5 attached to the end of Link 4 and is rotatable about axis ($Z_4$) of Link 4 and Link 6 is rotatable about axis ($Z_5$) of Link 5.

The actuator torques (forces) of the Wrist 20 required by the actuators moving the various links are computed using recursive Newton-Euler equations as taught by Luh et al cited above. The computations are referred to the base coordinates through Link 3 coordinates, the velocities and accelerations of which are simple functions of the parameters and variables of the first three links. The computation starts with the Link 4, and propagates the velocities and the accelerations out to the last link, and then evaluates the actuator torques (forces) starting from the last link back to actuator moving Link 4. Because of the simplicity of most manipulator wrists, the equations can be written out explicitly for each link. Such a formulation uses less than 40% of the arithmetic operations required by the general recursive Newton-Euler algorithm. Further reductions in the computational time for the nonlinear dynamics are due to program execution optimization. Because the first-three-link models and the wrist models are very simple, these models appear in symbolic form in the program. This allows for the grouping of similar terms and other operation saving manipulation well known to those skilled in the art.

In addition to the actuator torques, the nonlinear dynamics control also computes the forces and moments required at the end of Link 3, in order to support the Wrist 20. These latter forces and moments are always computed in the standard coordinates of Link 3.

The second part of the nonlinear dynamics control computes the torques (forces) of actuators for Links 1, 2, and 3, using Lagrangian dynamics. These torques (forces) are primarily due to four effects:

a. Translational inertia ($T_t$) of Links 1, 2, and 3.
b. Rotational inertia ($T_r$) of Links 1, 2, and 3.
c. Gravity forces ($T_g$) acting on Links 1, 2, and 3
d. Forces and torques ($T_w$) required to support the wrist 20.

The total torque ($T_i$) required from actuator i is given by $$T_i = T_{ti} + T_{ri} + T_{gi} + T_{wi} \quad (4)$$

The first two components are evaluated as follows:

$$T_{ti} = \quad (5)$$

$$\sum_j M_j \sum_{p=x,y,z} \left\{ V_{jp} \left[ \frac{d}{dt}\left(\frac{\partial V_{jp}}{\partial \dot{q}_i}\right) - \frac{\partial V_{jp}}{\partial q_i} \right] + \dot{V}_{jp}\left(\frac{\partial V_{jp}}{\partial \dot{q}_i}\right) \right\}$$

where
$V_{jp}$ = velocity of the center of gravity of link $j$, along its $p$ coordinate
$M_j$ = mass of link $j$
$q_i$ = link $i$ joint angle (displacement)
$i$ = actuator number
$j$ = link number
$p$ = $x$, $y$ or $z$
and $$T_{ri} = \frac{d}{dt}\left(\frac{\partial K_r}{\partial \dot{q}_i} - \frac{\partial K_r}{\partial q_i}\right) \quad (6)$$

where
$K_r^*$ = Kinetic coenergy due to rotation of Links 1, 2 and 3, given by $$K_r^* = \sum_{j=1}^{3} [\tfrac{1}{2}(I_{jxx}w^2_{jx} + I_{jyy}w^2_{jy} + I_{jzz}w^2_{jz}) + \quad (7)$$

$$I_{jxy}w_{jx}w_{jy} + I_{jyz}w_{jy}w_{jz} + I_{jzx}w_{jz}w_{jx}]$$

where
$w_{jp}$ = angular velocity of link $j$, about its $p$ coordinate
$I_j$ = moment of inertia of link $j$, in its system of coordinates The contribution due to gravity, $T_g$, and the contribution due to the wrist, $T_w$, can be written down by inspection.

The above version of Lagrange's equation requires less than 40% of the arithmetic operations required by method taught by Luh et al cited above. Again further savings of computational time can be realized by program execution optimization. The equations for the first three links, Links 1, 2 and 3, appear in symbolic form in the program and are conveniently separated into terms corresponding to inertia forces, centripetal forces, Coriolis forces and gravity forces. The Wrist 20 is represented in the computations for the first three links by the forces and moments it applies to the Link 3, in numerical form. The use of Lagrangian dynamics for the first three links is advantageous for controlling of manipulators which are not open kinematic chains. The developed control easily accommodates for various types of manipulator configurations, because the first-three-link model is derived directly from basic principles of dynamics and are typical to most robot arms.

SUMMARY OF THE ALGORITHM

The complete algorithm can be summarized by the following seven steps using the robot arm as disclosed by Hohn.

1. Compute the velocities and accelerations $V_3$, $w_3$, $\dot{V}_3$ and $\dot{w}_3$ acting on Wrist Joint 14, in Link 3 coordinates using Lagrangian dynamics as described by Luh et al cited above. The equations for the velocities and accelerations are as follows:

$V_{3x} = \dot{\theta}_2 a_2 \cos\theta_3 + (\dot{\theta}_2 + \dot{\theta}_3)a_3 - (d_2 + d_3)\dot{\theta}_1 \sin(\theta_2 + \theta_3)$ $V_{3y} = -\dot{\theta}_1(a_2 \cos\theta_2 + a_3 \cos(\theta_2 + \theta_3))$ $V_{3z} = \dot{\theta}_2 a_2 \sin\theta_3 + (d_2 + d_3)\dot{\theta}_1 \cos(\theta_2 + \theta_3)$ $w_{3x} = \dot{\theta}_1 \cos(\theta_2 + \theta_3)$ $w_{3y} = \dot{\theta}_2 + \dot{\theta}_3$ $w_{3z} = \dot{\theta}_1 \sin(\theta_2 + \theta_3)$ $\dot{V}_{3x} = \ddot{\theta}_2 a_2 \cos\theta_3 + (\ddot{\theta}_2 + \ddot{\theta}_3)a_3 + \dot{\theta}_2^2 a_2 \sin\theta_3 - (d_2 + d_3)\ddot{\theta}_1 \sin(\theta_2 + \theta_3) + \dot{\theta}_1^2(a_2\cos 2\theta_2 + a_3\cos(\theta_2 + \theta_3))\sin(\theta_2 + \theta_3) + g\cos(\theta_2 + \theta_3)$ $\dot{V}_{3y} = \ddot{\theta}_1 (a_2 \cos\theta_2 + a_3 \cos(\theta_2 + \theta_3)) + 2\dot{\theta}_1 (\dot{\theta}_2 a_2 \sin\theta_2 + (\dot{\theta}_2 + \dot{\theta}_3) a_3 \sin(\theta_2 + \theta_3))$ $\dot{V}_{3z} = \ddot{\theta}_2 a_2 \sin\theta_3 - a_3 (\dot{\theta}_2 + \dot{\theta}_3)^2 - \dot{\theta}_1^2(a_2 \cos\theta_2 + a_3 \cos(\theta_2 + \theta_3)) \cos(\theta_2 + -\theta_3) - \dot{\theta}_2 a^2 \cos\theta_3 + g \sin(\theta_2 + \theta_3) + (d_2 + d_3)\ddot{\theta}_1\cos(\theta_2 + \theta_3).$ and $\dot{w}_{3x} = \ddot{\theta}_1 \cos(\theta_2 + \theta_3) - \dot{\theta}_1 (\dot{\theta}_2 + \dot{\theta}_3) \sin(\theta_2 + \theta_3).$
$\dot{w}_{3y} = \ddot{\theta}_2 + \ddot{\theta}_3.$
$\dot{w}_{3z} = \ddot{\theta}_1\sin(\theta_2 + \theta_3) + \dot{\theta}_1 (\dot{\theta}_2 + \dot{\theta}_3) \cos(\theta_2 + \theta_3)$ In the above computations $a_2$ is the length of link 2, $a_3$ is the length of link 3, g is the acceleration due to gravity, $\dot{\theta}_1$, $\dot{\theta}_2$ and $\dot{\theta}_3$ are the measured angular velocities of Links 2 and 3 respectively, and $\theta_1$, $\theta_2$ and $\theta_3$ are the measured angular displacements of Links 1, 2 and 3, respectively as indicated in FIG. 1. The distance $d_2$ is the offset distance of Link 2 from Link 1 along the Z, axis and $d_3$ is the offset distance of line 3 from Link 2 along the $z_2$ axis.

2. Compute the torques (forces) for the actuators for Links 4, 5 . . . n and the forces and torques required to support the Wrist 20 at the end of Link 3 (Link 3 and Link 4 interface) using the recursive Newton-Euler algorithm described by Hollerbach cited above. A summary of this algorithm, presented in the Section entitled "Recursive Newton-Euler Dynamics", is as follows:

$$\begin{aligned}
w_i &= w_{i-1} + z_{i-1}\dot{\theta}_i & f_i &= F_i + f_{i+1} \quad (8)\\
\dot{w}_i &= \dot{w}_{i-1} + z_{i-1}\ddot{\theta}_i + w_{i-1}xz_{i-1}\dot{\theta}_i & n_i &= n_{i+1} + (p_i^* + r_i^*)xF_i \\
\dot{p}_i &= \dot{w}_ixp_i^* + w_ix(w_ixp_i^*) + \ddot{p}_{i-1} & & + N_i + p_i^*xf_{i+1}\\
\ddot{r}_i &= \dot{w}_ix(w_ixr_i^*) + \dot{w}_ixr_i^* + \ddot{p}_i & T_i &= z_{i-1} n_i \\
F_i &= M_i\ddot{r}_i & & \text{for } i = 6, 5, 4 \\
N_i &= I_i\dot{w}_i + w_ix(I_iw_i) & & \\
\text{for } i &= 4, 5, 6 & &
\end{aligned}$$

where:
$w_i$ = the angular velocity of Link i
$\dot{w}_i$ = the angular acceleration of Link i
$F_i$ = total external force or Link i
$N_i$ = total external torque on Link i
$T_i$ = Link i actuator torque (force)
$I_i$ = inertial tensor of Link i about its center of mass
$f_i$ = force exerted on Link i by Link (i−1)
$n_i$ = moment exerted on Link i by Link (i−1)
$p_i$ = vector from the base coordinate origin to the joint i coordinate orgin.
$p_i^*$ = vector from coordinate origin (i−1) to origin i
$r_i$ = vector from the base coordinate origin to Link i center of mass
$r_i^*$ = vector from coordinate origin i to Link i center of mass $M_i$ = mass of Link i $z$ = vector along the axis of joint i+1

3. Using Equation 5 compute $T_{ti}$, the torques (forces) required from the actuators for Links 1, 2 and 3 due to translational inertia of Links 1, 2, and 3.

4. Using Equation 6 compute $T_{ri}$, the torques (forces) required from the actuators for Links 1, 2 and 3 due to rotational inertia of Links 1, 2, and 3.

5. Compute $T_{gi}$, the torques (forces) required from the actuators for Links 1, 2 and 3 due to gravity action on Links 1, 2 and 3.

$$T_{g3} = M_3 g[a_3 + s_{3x})\cos(\theta_2 + \theta_3) - s_{3y}\sin(\theta_2 + \theta_3)] \quad (9)$$

$$T_{g2} = T_{g3} + g[M_3 a_2 \cos\theta_2 + M_2[(a_2 + S_{2x})\cos\theta_2 - s_{2y}\sin\theta_2)]$$

$$T_{g1} = 0$$

where $s_i$ is the location of the center of mass of link i in Link i coordinates.

6. Compute $T_{wi}$, the torques (forces) required from the actuators for Joints 11, 12 and 13 to balance the force and moments the wrist applies on the end of link 3.

$$T_{w1} = -F_z[a_2\cos\theta_2 + a_3\cos(\theta_2+\theta_3)] + T_x\sin(\theta_2+\theta_3) + T_y\cos(\theta_2+\theta_3)$$

$$T_{w2} = T_z + F_x a_2\sin\theta_3 + F_y(a_3 + a_2\cos\theta_3) \quad (10)$$

$$T_{w3} = T_z + F_y a_3$$

where $F_x$, $F_y$, $F_z$, $T_x$, $T_y$, $T_z$ are the interface forces and moments between Link 3 and Link 4.

7. Using Equation 4 compute $T_i$, the total torques (forces) required from the actuators for Links 1, 2 and 3.

IMPLEMENTATION

Figure 4:
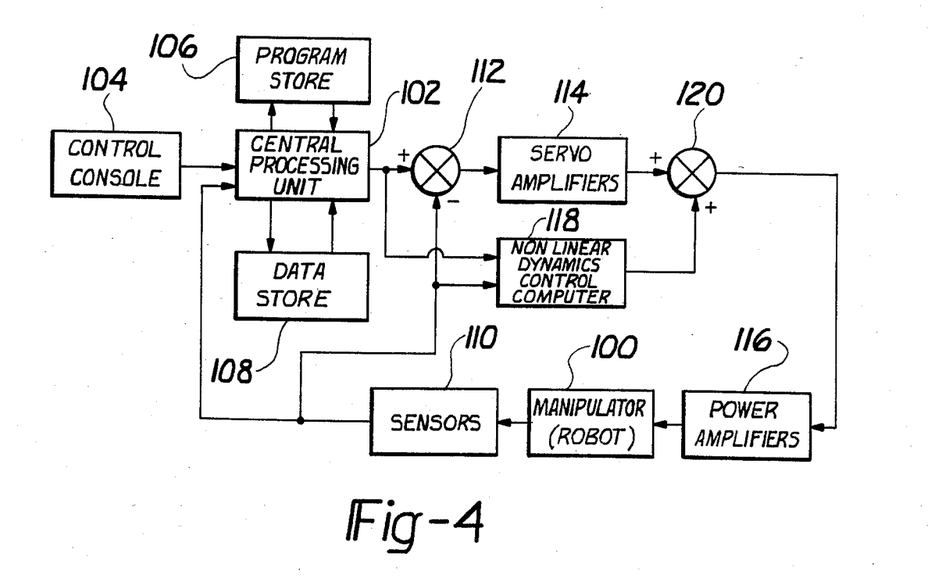
FIG. 4 is a block diagram of the manipulator control system.

FIG. 4 is a detailed block diagram for a manipulator control system. The kinematic portion of the system comprises a Central Processing Unit (CPU) 102, a Control Console 104, a Program Store 106 and a Data Store 108. The Control Console 104 provides the operator with the necessary controls and displays to generally operate a Manipulator 100 as is known in the art. The system will also include other conventional peripheral devices (not shown) such as a machine input/output device concerned with machine oriented functions such as switches, solenoids and other similar devices associated with the Manipulator 100 and a process input/output device for integrating or coordinating the operating of the Manipulator with other machines.

The operational program of the Central Processing Unit 102 is stored in the Program Store 106 while the data used by the Central Processing Unit 102 in the execution of its program is stored in Data Store 108. The data stored in Data Store 108 will include constants used in the calculations, feedback data received from Sensors 110 detecting the actual position, velocity, and or, acceleration of the various links of the Manipulator 100 as well as any partial solutions generated in the execution of the program as may be required.

The Central Processing Unit 102, in response to the inputs received from the Control Console 104 will execute the program stored in the Program Store 106 using the data stored in Data Store 108, and generate electrical signals indicative of the desired motion of the individual links in the Manipulator 100.

These desired motion signals are converted into actual motion of the manipulator by a conventional dynamic control loop comprising Sum Amplifier Means 112, Servo Amplifiers 114 and Power Amplifier 116. Sum Amplifier 112 subtracts the feedback signals indicative of the actual position, velocity and acceleration of each link from the associated motion signal to produce a difference signal for each manipulator link. The Servo Amplifiers 114 convert the individual difference signals to dynamic actuator signals indicative of the torques or forces required to move the associated links of the manipulator along the desired path. The individual servo amplifiers execute the linear control laws for manipulator motion and include dynamic compensators for achieving fast and stable response.

Power Amplifiers 116 amplify the actuator signals to power levels required by the individual actuators to produce the desired torque or force. The outputs from Power Amplifiers 116 are received by the individual actuators which move the individual links of the Manipulator 100 with the desired motion. When the actuators in the Manipulator are electric motors, the output of Power Amplifiers 116 will be electric signals actuating the electric motors. Alternatively if the manipulator actuators are hydraulic or pneumatic devices, the output of the Power Amplifiers 116 will be hydraulic or pneumatic signals as is known in the art.

The control system as described above represents the current state of the art of manipulator control systems. As previously indicated, the control law used in these systems is based on ignoring the complex (nonlinear) dynamics of the various moving elements. Currently this approach is satisfactory since the complex dynamics of the various elements may be adequately compensated for by programming the control law for a worst case situation and using brute force to impart to each link the desired motion. This approach is not the most effective or efficient way to control a manipulator and results in less than optimal response.

The dynamic response of the Manipulator 100 can be improved by providing a second dynamic control loop which corrects the torque signals output from the Servo Amplifiers 114 for the complex (nonlinear) dynamics of the various moving elements. Refering back to FIG. 4 this second dynamic control loop comprises a Nonlinear Dynamics Control Computer 118 for computing a correction factor for each link in the manipulator and a Sum Amplifier Means 120 for summing the computed correction factors with the corresponding torque signals output from the Servo Amplifiers 114. The correction factors correct each of the actuator signals for the complex dynamics of the individual links previously ignored. The Nonlinear Dynamics Control Computer 118 receives the desired motion signals generated by the Central Processing Unit 102 and the feedback signals generated by Sensors 110. The Nonlinear Dynamics Control Computer 118 then computes the correction factors for the first three links using Lagrange's equations and the correction factors for the remaining links using the recursive Newton-Euler algorithm as previously described. The computed correction factor for each link is then summed with the associated torque signals in Sum Amplifier Means 120. Sum Amplifier Means 120 comprises a plurality of sum amplifiers, one associated with each of the servo amplifiers of Servo Amplifiers 114 as shall be discussed relative to FIG. 5.

Figure 5:
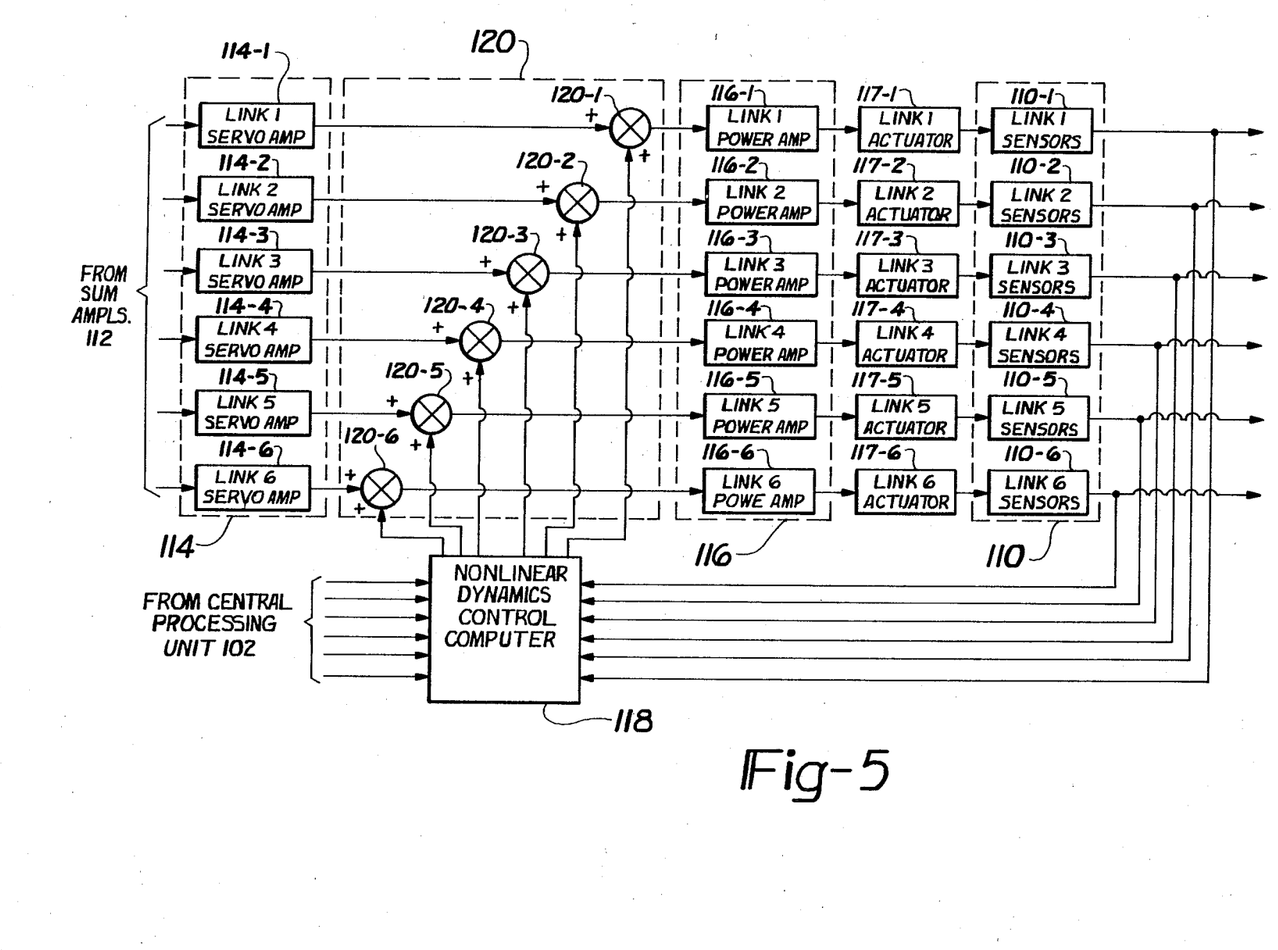
FIG. 5 is a block diagram showing nonlinear dynamics control in greater detail.

Referring now to FIG. 5, there is shown in greater detail, the second dynamic control loop for a six (6) link manipulator. The Nonlinear Dynamics Control Computer 118 may be any commercially available microprocessor, such as the 16 bit Intel 8086 or Motorola 68000 microprocessor or any of the newer 32 bit microprocessors recently introduced or currently under development. The Nonlinear Dynamics Control Computer 118 receives directly the desired motion signals from the Central Processing Unit 102 and the feedback signals from Sensors 110 individually identified as Sensors 110-1 through 110-6 associated with the individual Links 1 through 6. Each link may have one or more sensors, generating signals indicative of the links current position, velocity, and/or acceleration as is known in the art.

The Nonlinear Dynamic Control Computer 118 computes the correction factors for the actuator signals output from the individual Servo Amplifiers 114-1 through 114-6 in response to the desired motion signals and the feedback signals. The correction factor signals output from the Dynamic Control Computer 118 are individually summed with the associated actuator signals generated by Servo Amplifiers 114-1 through 114-6 individual Sum Amplifiers 120-1 through 120-6 as shown. The corrected actuator signals output from Sum Amplifiers 120-1 through 120-6 are individually amplified in Power Amplifiers 116-1 through 116-6 to drive the individual Actuators 117-1 through 117-6 associated with Links 1 through 6 respectively. The individual Sensors 110-1 through 110-6 detect the current state of their respective links and generate feedback signals communicated back to Central Processing Unit 102, Sum Amplifiers 112 and the Nonlinear Dynamics Control Computer 118.

Figure 6:
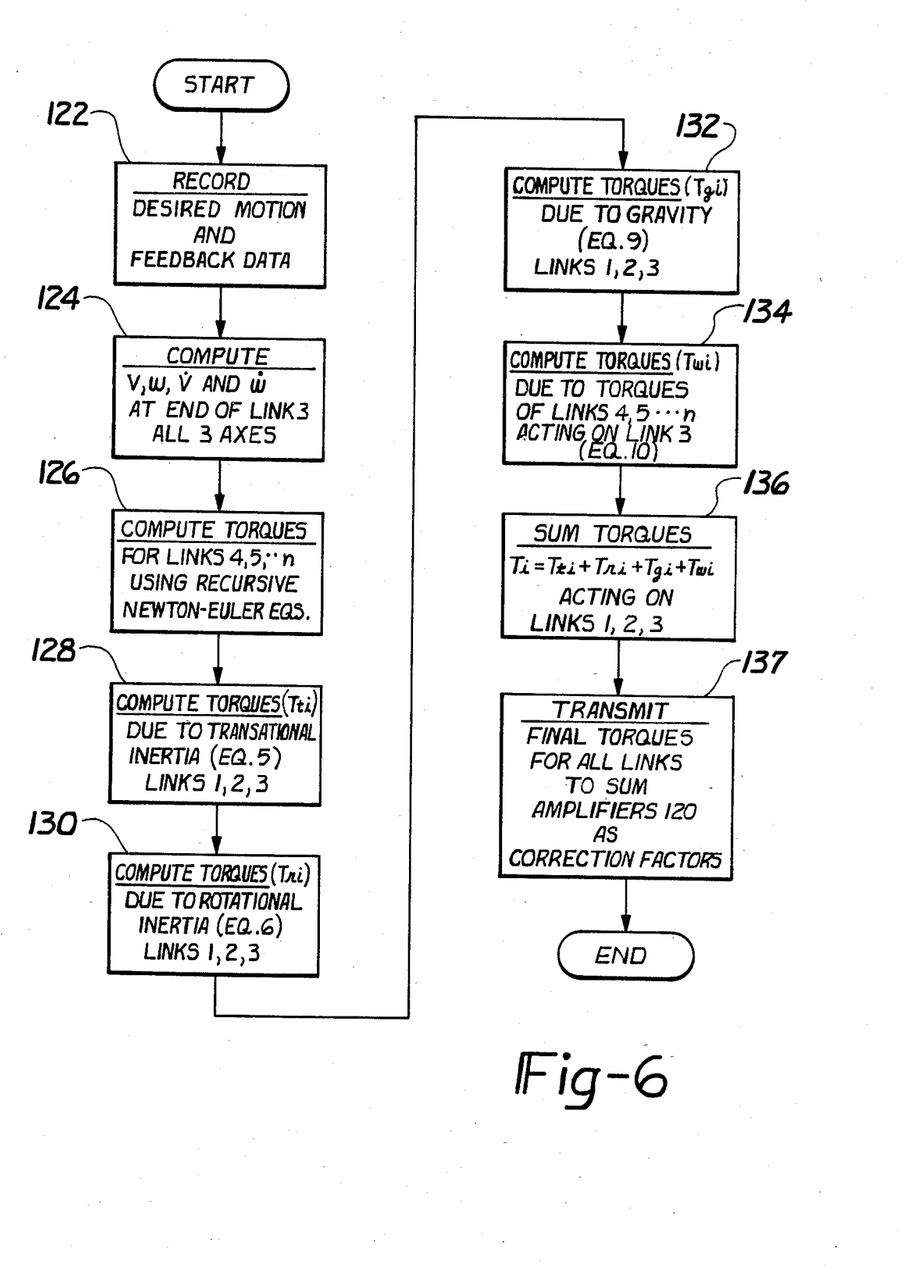
FIG. 6 is a flow diagram for the nonlinear dynamic control computer.

The program flow diagram for Nonlinear Dynamics Control Computer 118 is illustrated in FIG. 6. The program begins by recording the desired motion signals received from the Central Processing Unit 102 and the feedback signals received from the Sensors 110-1 through 110-6 as indicated by block 122. The program then proceeds to compute the linear velocity V, linear acceleration $\dot{V}$, angular velocity w and angular acceleration $\dot{w}$ at the end of Link 3 in Link 3 coordinates as indicated by block 124 using the Lagragian dynamics equations previously described.

The next step is to compute the torques and/or forces required from actuators 4, 5 . . . n associated with Links 4 through n of the Wrist 20 and the forces and torques required to support the Wrist 20 at the interface between Links 3 and 4 using the recursive Newton-Euler equation as indicated by block 126. The details of the procedure are the same as algorithm (8) previously described.

The program then proceeds to compute the torques and forces due to inertia on Links 1, 2 and 3 as indicated by block 128. These computations are conducted through the use of Equation 5.

Next the torques or forces due to rotational inertia of Links 1, 2 and 3 are computed as indicated by block 130. These forces are computed using Equation 6.

The program next proceeds to compute the forces due to gravity as indicated by block 132. Equations for the forces due to gravity are well known and are easily derived for the specific manipulator. These forces are computed using Equation 9.

This computation is followed by the computation of the torques or forces $T_{wi}$ required from the actuators for Links 1, 2 and 3 to balance the forces and moments the wrist applies to the end of Link 3 as indicated by block 134. These computations are made using Equation 10.

Finally, the total torques or forces for the actuators of Links 1, 2 and 3 are computed as indicated by block 136. These torques are computed using Equation 4 as previously indicated. Namely:

$$T_i = T_{ti} + T_{ri} + T_{gi} + T_{wi}$$

The last operation of the Nonlinear Dynamics Control Computer 118 is to output the computed torques and forces as correction factor signals to Sum Amplifiers 120-1 through 120-6, as indicated by Block 137, where they are summed with the actuator signals.

Inspection of the program represented by the flow diagram illustrated on FIG. 6 shows that the computations performed by blocks 124 and 126 are independent of the computations performed by blocks 128, 130 and 132 and need not be performed in the indicated sequence. Additionally, the computer time required for the computations of blocks 124 and 126 is approximately the same as the computer time required for the computations of blocks 128, 130 and 132. Therefore, the computer time for making these computations can be cut in half by independently performing the computations of blocks 124 and 126 in parallel with the computations of blocks 128, 130, and 132 using two microprocessors such as Microprocessor 138 and Microprocessor 140 as shown in FIG. 7.

Figure 7:
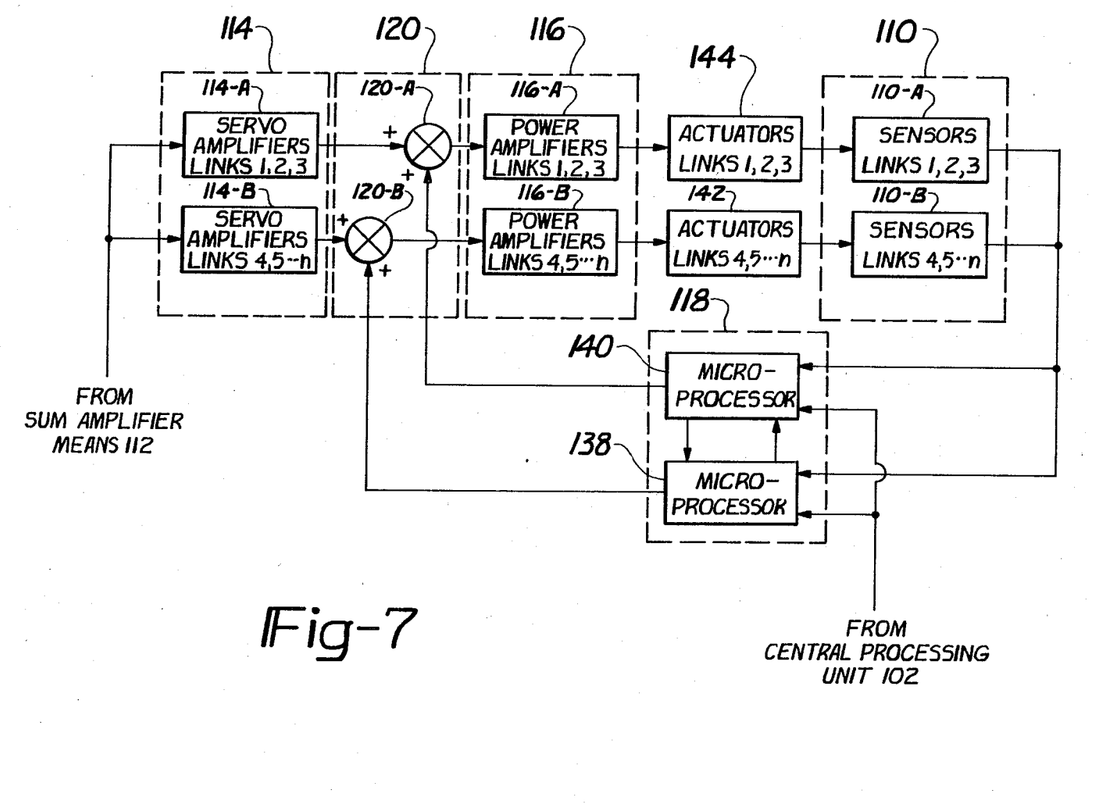
FIG. 7 is a block diagram of the nonlinear dynamics control system using two microprocessors for the nonlinear dynamics control computer.

Referring to FIG. 7, Microprocessor 138 computes the correction factors for the nonlinear dynamics for the wrist actuators using the recursive Newton-Euler Equation computations of blocks 124 and 126 while Microprocessor 140 computes the correction factors for the nonlinear dynamics of the arm actuators (actuators for Links 1, 2 and 3) using the Lagrange Equation computations of blocks 128 through 132. The computations of blocks 134 and 136 are then completed in Microprocessor 140 using the results of the computations of block 126 in Microprocessor 138 in combination with the results of the computations performed in blocks 128, 130, and 132.

The correction factors computed by Microprocessor 138 for the wrist are added to the outputs from the Servo Amplifiers 114-4, 114-5, . . . 114-n collectively designated Servo Amplifiers 114-B by a plurality of individual sum amplifiers, such as Sum Amplifiers 120-4, 120-5 . . . 120-n, collectively designated Sum Amplifier 120-B. The outputs of the individual Sum Amplifiers 120-B are individually amplified by a like plurality of power amplifiers, Power Amplifiers 116-B which activate the actuators, Actuators 142 associated with Links 4, 5, . . . n. The sensors associated with Links 4, 5, . . . n, Sensors 110-B, generate position and velocity feedback signals for the Central Processing Unit 102 and the Dynamic Control Computer 118.

In a like manner, the correction factors generated by Microprocessor 140, for the first three links, Link 1, 2 and 3, are added to the outputs from Servo Amplifiers 114-1, 114-2 and 114-3, collectively designated Servo Amplifier 114-A by Sum Amplifiers 120-1, 120-2, and 120-3, collectively designated Sum Amplifier 120-A. The summed signals are amplified in individual Power Amplifiers 116-1, 116-2, and 116-3, designated Power Amplifiers 116-A, which activate the actuators for Links 1, 2, and 3, designated Actuators 144. The Sensors 110-1, 110-2, 110-3, designated Sensors 110-A generate position and velocity feedback signals to the Central Processing Unit and Dynamic Control Computer as previously described.

Figure 8:
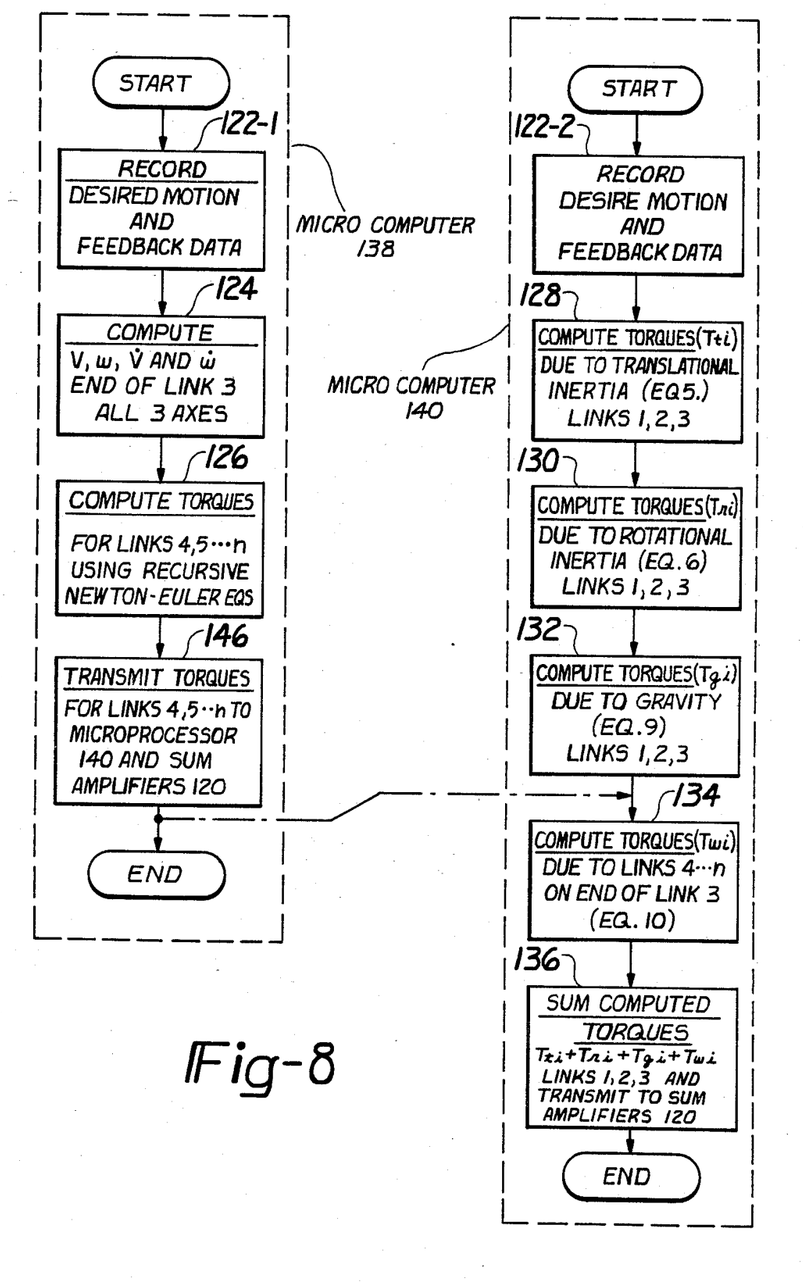
FIG. 8 is a flow diagram showing the division of the computations between the two microprocessors in the nonlinear dynamic control loop of FIG. 7.

The parts of the program shown on the flow diagram of FIG. 6 executed by individual Microprocessors 138 and 140 are shown on FIG. 8. Referring to FIG. 8, Microprocessor 138 computes the torques and forces for Links 4, 5 . . . n using the recursive Newton-Euler Equation as previously described with reference to blocks 124 and 126. The torques computed in block 126 for Links 4, 5 . . . n are transmitted to Microprocessor 140 to complete the computations of the torques for Links 1, 2 and 3 as indicated by block 146. The torques computed by block 126 are also transmitted to Sum Amplifiers 120-4, 120-5, . . . 120-n as the correction factors for the actuator signals output from Servo Amplifiers 114-4, 114-5, . . . 114-n. Simultaneously and in parallel, Microprocessor 140 computes the torques for Links 1, 2 and 3 to balance translation inertia, rotational inertia and gravity using Lagrange's Equations as indicated by blocks 128, 130 and 132. The computed torques and forces for Links 4, 5 . . . n received from Microprocessor 138 are then utilized in Microprocessor 140 to compute the torques and/or forces required to balance the forces of Links 4, 5 . . . n acting on the end of Link 3 as indicated by block 134. Finally, all of the forces acting on Links 1, 2, and 3 are summed together to generate the nonlinear torques acting on Links 1, 2, and 3 which are output as the correction factors for the respective links.

Using this second dynamic control loop, the manipulator control system is capable of compensating for the nonlinear dynamics of the manipulator system in a more precise and efficient manner. By dividing the links of the manipulator into two sets and placing the origin of the third link coordinates at its end, the nonlinear forces acting on links 4, 5, . . . n which normally comprise Wrist 20 can efficiently be computed using the recursive Newton-Euler Equations and the nonlinear torques and forces acting on Links 1, 2 and 3 can be computed using Lagrangian Dynamics. This nonlinear dynamic control system, reduces the required computer time to compute the desired correction factors for each of the links to within a range from 0.003 to 0.004 seconds which is about 5 times faster than using Newton-Euler dynamics as taught by Luh et al. Further by using two microprocessors in the Nonlinear Dynamic Control Computer, the computer time can be further reduced by a factor of approximately 2 making the dynamic manipulator control system almost 10 times faster than the prior art and well within the desired 0.01 seconds.

Having disclosed the invention it is recognized that those skilled in the art may take changes to the embodiment and algorithms disclosed herein without departing from the spirit of the invention as described herein and set forth in the appended claims.

Having described the invention what is claimed is:

1. In combination with a manipulator control system having a multiple link manipulator, a central processing unit having adequate storage and computational means for generating motion signals indicative of the desired motion of the manipulator links, a linear dynamic control loop for generating actuator signals controlling actuators moving the individual manipulator links, and sensors responsive to position and motion of said manipulator links for generating feedback signals to the central processing unit and the linear dynamic control loop, a nonlinear dynamics control loop for correcting the actuator signals for the nonlinear dynamics of the manipulator characterized by:

nonlinear dynamics control computer means for generating correction factors for each of the actuators moving the manipulator links in response to the motion signals generated by the central processing unit and the feedback signals, said nonlinear dynamics control computer computing said correction factors for a predetermined number of manipulator links, using Lagrangian dynamics and computing correction factors for the remaining manipulator links using recursive Newton-Euler dynamics; and means for individually summing said correction factors with the associated actuator signals to generate corrected actuator signals, corrected for the nonlinear dynamics of the manipulator.

2. The combination of claim 1 wherein said predetermined number of manipulator links is the first three links starting from the base.

3. The combination of claim 2 wherein said nonlinear dynamics control computer comprises:

first means for computing the linear velocity and linear acceleration and the angular velocity and angular acceleration at the end of the third link, in third link coordinates;

second means for computing the correction factors for said remaining links using recursive Newton-Euler dynamics;

third means for computing the torque to balance translational inertia forces for the first three links;

fourth means for computing the torque necessary to balance rotational inertia forces for said first three links;

fifth means for computing the torque necessary to balance gravitational force for said first three links;

sixth means for computing the torques on said first three links due to the torques and forces applied to the end of said third link by said remaining links; and seventh means for summing the torques computed by said third through sixth means to generate said correction factors for the first three links.

4. The combination of claim 3 wherein the coordinates of the third link have their origin at the end of the third link.

5. The combination of claim 3 wherein said nonlinear dynamics computer comprises:

a first microprocessor comprising said first and second means;

a second microprocessor comprising said third through seventh means; and means for communicating the correction factors computed by said first microprocessor to said second microprocessor.

6. The combination of claim 3 wherein said nonlinear dynamics control computer is a microprocessor programmed to perform the computations of said first through seventh means.

7. In combination with a control system for a multiple link manipulator having a central processing unit having adequate storage and computational capabilities for generating motion signals indicative of the desired motion of each link, a linear dynamic control loop for generating actuator signals for activating actuators moving the individual links with the desired motion and sensors detecting the position and motion of said links for generating feedback signals to said central processing unit and said linear dynamic control loop, a method for correcting said actuator signals for the nonlinear dynamics of the manipulator characterized by:
- dividing the multiple links of the multiple link manipulator into a first set comprising a predetermined number of links and a second set comprising the remaining links;
- computing a first set of correction factors for said remaining links using recursive Newton-Euler dynamics in response to said desired motion signals and said feedback signals;
- computing a second set of correction factors for said predetermined number of links using Lagrangian dynamics in response to said desired motion signals, said feedback signals and said first set of correction factors;
- summing said correction factors of said first and second set of correction factors with their associated actuator signals to generate corrected actuator signals corrected for the nonlinear dynamics of the manipulator links; and
- activating the individual actuators of the manipulator with said corrected actuator signals to move their associated link with the desired motion.

8. The method of claim 7 wherein said predetermined number of links is the first three links starting from the base and wherein said remaining links include at least a fourth link.

9. The method of claim 8 wherein said step of computing a first set of correction factors computes said first set of correction factors in the coordinates of the third link, the coordinates of said third link having their origin at the interface between said third link and said fourth link.

10. The method of claim 9 wherein said step of computing said first set of correction factors comprises:
- computing the linear velocity and linear acceleration at the interface of said third and fourth links in response to said desired motion and feedback signals;
- computing the rotational velocity and rotational accelerations at the interface between said third and fourth links in response to said desired motion and feedback; and
- computing the nonlinear torques and forces required by the actuators of said remaining links using recursive Newton-Euler dynamics in response to said desired motion signals, feedback signals and said computed linear and rotational velocities and accelerations.

11. The method of claim 10 wherein said step of computing nonlinear torques and forces using recursive Newton-Euler dynamics solves the following equations in a forward direction from $i=4$ to $i=n$ $$w = w_{i-1} + z_{i-1}\dot{\theta}_i$$

$$\dot{w}_i = \dot{w}_{i-1} + z_{i-1}\ddot{\theta}_i + w_{i-1} \times z_{i-1}\dot{\theta}$$

$$\dot{p}_i = \dot{w}_i \times p_i^* + w_i \times (w_i \times p_i^*) + \dot{p}_{i-1}$$

$$\ddot{r}_i = w_i \times (w_i \times r_i^*) + \dot{w}_i \times r_i^* + \ddot{p}_i$$

$$F_i = M_i \ddot{r}_i$$

$$N_i = I_i \dot{w}_i + w_i \times (I_i w_i)$$

and solves the following equations in a backward direction from link "n" to link 4:

$$f_i = F_i + f_{i+1}$$

$$n_i = n_{i+1} + (p_i + \vec{r}_i^*) \times F_i + N_i + p_i^* \times f_{i+1}$$

$$T_i = z_{i-1} n_i$$

where:
- $w_i$ = the angular velocity of Link i
- $\dot{w}_i$ = the angular acceleration of Link i
- $F_i$ = total external force or Link i
- $N_i$ = total external torque on Link i
- $T_i$ = Link i actuator torque (force)
- $I_i$ = inertion tensor of Link i about its center of mass
- $f_i$ = force exerted on Link i by Link (i−1)
- $n_i$ = movement exerted on Link i by Link (i−1)
- $p_i^*$ = vector from the base coordinate origin to the joint i coordinate origin
- $p_i^*$ = vector from coorindate origin (i−1) to origin i
- $r_i$ = vector from the base coordinate origin to link i center of mass
- $r_i^*$ = vector from coordinate origin i to Link i center of mass
- $M_i$ = mass of Link i
- $z$ = the vector along the axis of joint $i+1$.

12. The method of claim 9 wherein said step of computing the second set of correction factors comprises the steps of:
- computing nonlinear torques ($T_{ti}$) for the actuators associated with said first three links to balance the inertial forces in response to said desired motion and feedback signals:
- computing nonlinear torques ($T_{ri}$) for the actuators associated with said first three links to balance the rotational inertial forces in response to said desired motion and feedback signals;
- computing nonlinear torques ($T_{gi}$) for the actuators associated with said first three links to balance the torques and forces due to the remaining links acting on the end of the third link to balance the torques and forces due to gravity in response to said desired motion and feedback signals;
- computing torques ($T_{wi}$) for the actuators associated with said first three links to balance the torques and forces due to the remaining links acting on the end of the third link in response to said desired motion signals, said feedback signals and said correction signals generated for said remaining links; and
- summing said torques, $T_{ti}$, $T_{ri}$, $T_{gi}$ and $T_{wi}$ to generate said correction factors for said first three links.

13. The method of claim 10 wherein said step of computing said first set of correction factors is computed in a first microprocessor, and the first three steps of said step of computing said second set of correction factors are computed in a second microprocessor in parallel with the computation of said first set of correction factors and the remaining two steps of said step of computing said second set of correction factors are subsequently computed in one of said first and second microprocessors.

14. The method of claim 13 wherein said remaining two steps are computed in said second microprocessor.

15. A control system for a multiple link manipulator having a base and a plurality of actuators, at least one actuator associated with each manipulator link, for moving its associated link in response to input signals, said control system comprising:

sensor means associated with each manipulator link for generating feedback signals indicative of the actual position and motion of each manipulator link;

central processing unit means having adequate storage and computation means responsive to a stored program and said feedback signals for generating motion signals indicative of the desired motion of the individual manipulator links;

a linear dynamic control loop responsive to said desired motion signals and said feedback signals for generating said input signals activating said plurality of actuators to move their associated link with the desired motion;

a nonlinear dynamic control loop responsive to said desired motion signals and said feedback signals for generating correction factor signals for each of the actuators compensating for the nonlinear dynamics of the manipulator, said nonlinear dynamics control loop computing said correction factors for a predetermined number of actuators, using Lagrangian dynamics and computing said correction factors for the remaining actuators using recursive Newton-Euler dynamics; and means for individually summing said correction factors with the input signals to generate corrected input signals, corrected for the nonlinear dynamics of the manipulator.

16. The conrol system of claim 15 wherein said predetermined number of actuators are the three actuators associated with the first three links of the manipulator starting from the base.

17. The combination of claim 16 wherein said nonlinear dynamics control computer comprises:

first means for computing the linear velocity and linear acceleration and the angular velocity and angular acceleration at the end of the third link, in third link coordinates;

second means for computing the correction factors for said remaining links in the coordinates of the third link using recursive Newton-Euler dynamics;

third means for computing the torque to balance translational inertia forces for the first three links;

fourth means for computing the torque necessary to balance rotational inertia forces for said first three links;

fifth means for computing the torque necessary to balance gravitational force for said first three links;

sixth means for computing the torques on said first three links due to the torques and forces applied to the end of said third link by said remaining links; and seventh means for summing the torques computed by said third through sixth means to generate said correction factors for the first three links.

18. The combination of claim 17 wherein the coordinates of the third link have their origin at the end of the third link interfacing the fourth link.

19. The combination of claim 17 wherein said nonlinear dynamics computer comprises:

a first microprocessor comprising said first and second means;

a second microprocessor comprising said third through fourth means; and means for communicating the correction factors computed by said first microprocessor said second microprocessor.

20. The combination of claim 17 wherein said nonlinear dynamics control computer is a microprocessor programmed to perform the computations of said first through seventh means.

* * * * *